G. HILGENSTOCK.
PROCESS OF OBTAINING BY-PRODUCTS FROM GASES RESULTING FROM THE DRY DISTILLATION OF COAL, &c.
APPLICATION FILED JUNE 10, 1909.
1,099,089.
Patented June 2, 1914.
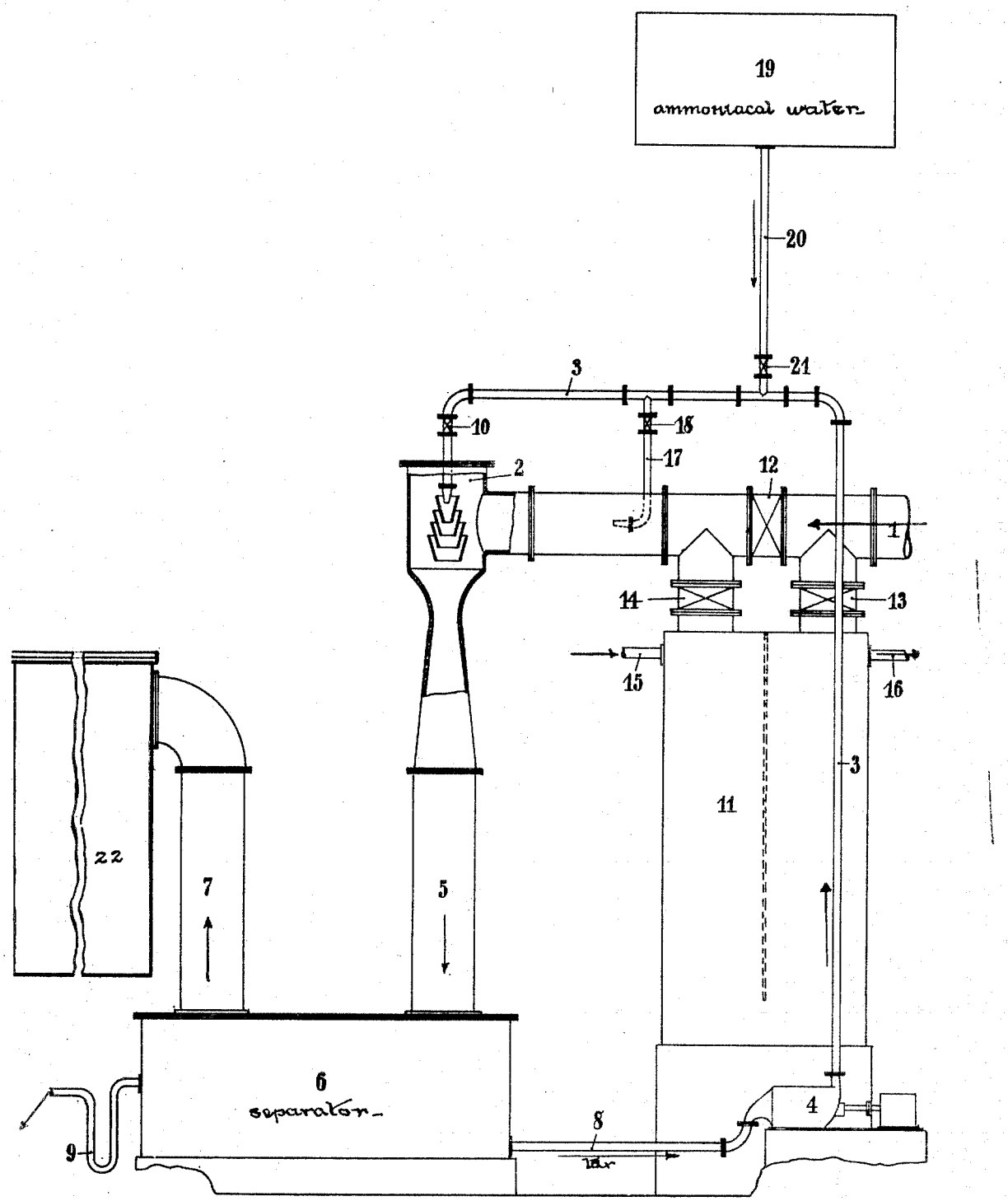

UNITED STATES PATENT OFFICE.

GUSTAV HILGENSTOCK, OF DAHLHAUSEN-ON-THE-RUHR, GERMANY.

PROCESS OF OBTAINING BY-PRODUCTS FROM GASES RESULTING FROM THE DRY DISTILLATION OF COAL, &c.

1,099,089. Specification of Letters Patent. Patented June 2, 1914.

Application filed June 10, 1909. Serial No. 501,390.

*To all whom it may concern:*

Be it known that I, GUSTAV HILGENSTOCK, a subject of the King of Prussia, Emperor of Germany, and a resident of Dahlhausen-on-the-Ruhr, Westphalia, Kingdom of Prussia, Germany, have invented certain new and useful Improvements in the Process of Obtaining By-Products from Gases Resulting from the Dry Distillation of Coal and other Materials, of which the following is a specification.

My invention relates particularly to an improved method of removing tar from gas, and comprises treatment of the gas for the removal of tar by scrubbing or otherwise, the scrubbing liquid being, preferably, tar or gas-liquor containing tar, and the regulation of the temperature of the gas and tar so that the outgoing gas has a temperature above that of the dew point for water vapor of such outgoing gas, and, preferably, so that the tar during and after the treatment has a temperature below that at which important proportions of valuable hydrocarbons are volatilized and carried over with the gas.

The object of my invention is to produce conditions of treatment whereby gases resulting from dry distillation of coal, and like gases, may have the tar, and the valuable hydrocarbons absorbable in tar, extracted from them without condensation of the aqueous vapor carried by the gas and without the disadvantages incident to such condensation, namely, the admixture of water with the tar and the absorption of ammonia in the water. This object I accomplish by washing or scrubbing or otherwise treating the gas with a suitable tar-removing substance, and by regulating the temperature within limits hereinafter stated; such washing or scrubbing and temperature regulation being effected, preferably, by passing the gas as it comes from the retorts through a spray of tar or gas liquor containing tar, whereby the tar carried by the gas will be removed therefrom in a manner well known to those skilled in the art, and by regulating the quantity, or the temperature, or both, of the washing liquid so as to maintain the temperature of the outgoing gas above the temperature at which water vapor in the gas will condense, and preferably, so as to maintain the temperature of the tar below the temperature at which valuable hydrocarbon constituents of tar will be carried off by the gas.

Several processes have become known to remove the tar from hot gases resulting from the dry distillation of coal and other materials. The most effective are those, which use the tar as washing fluid, because the tar itself is the best absorbing liquid for tar vapors. Of these methods the one which uses a tar injector, has shown the best results, for it is an easy matter to reduce the tar in the gas to less than $\frac{1}{10}$ gram in 1 cubic-meter. In this process as well as in all those, which use tar as washing fluid, it has become evident that the temperature of the liquid must not surpass a certain degree, or evaporation of valuable relatively volatile hydrocarbons will take place and cause troubles in further stages of the recovery process. Tests have shown, that this temperature is near 80° C. which the washing liquid—tar or water mixed with tar or both together—should have and which should not be exceeded, ordinarily, in the outgoing gas, and that this temperature keeps the temperature of the gas high enough to have all the ammonia absorbed, when the gas is led directly into an acid bath, to gain the ammonia salts in solid form. It is also evident, that the temperature of the washing liquid should not be much lower than 80° C., and not lower ordinarily than 60° C., for ordinary gases, which usually contain twenty per cent., by volume, or more of aqueous vapor, and the principal object must be, that these temperatures may be reached but not surpassed. One reason why the treatment should be conducted ordinarily between 60° and 80° C. is that the incoming gas carries more or less water vapor which will condense if the gas be cooled below the "dew point" as to water vapor, and this dew point is above 60° C. for all except very dry gases, *i. e.*, gases containing less than twenty per cent. by volume of water vapor, so that to avoid condensation of the moisture the temperature of the gas must not fall below the dew point as to water vapor, either in the tar extractor or in the conduit leading therefrom to the ammonia recovery apparatus; and another reason is that, as already stated, if the temperature rises above 80° C. the gas in passing off from the tar extractor will be apt to carry with it certain valuable relatively volatile hydrocarbons (such for example as hydrocarbons of the benzol and naphthalene series) which it is more difficult to recover during the latter stages of the recovery process than when such compounds are retained in the tar. Maintenance of temperature within the range stated, therefore is very important and can be effected in different ways, as by regulating the temperature of the gas, before it enters the tar injector, and also by regulating the amount of liquid used for washing.

The accompanying drawing shows a suitable apparatus partly in section for carrying out my improved process, in which—

1 is the main pipe through which gas is conducted to the tar injector 2; 3 is the pipe which supplies the injector 2 with tar by means of the pump 4; the mixture of gas and tar flows through pipe 5 into the vessel 6, where gas and tar are separated; the gas leaves the vessel 6 through pipe 7, whereas the tar is collected in the vessel 6, flows through suction pipe 8 to the pump 4, which forces it through pipe 3 into the tar injector 2. An excess of tar flows off through pipe 9 from the vessel 6.

10 is a valve in the pipe 3 for regulating the amount of the washing medium.

If the washing medium supplied by the pump 4 should not be sufficient for maintaining the temperature desired, a vessel 19 containing ammoniacal water is provided, such vessel being connected by means of pipe 20 to pipe 3; the supply of the ammoniacal water is regulated by valve 21. If the temperature of the gas is too high for maintaining the desired temperature of the washing liquid, it is cooled before entering the tar injector by leading it through pipe connection 13 to the cooler 11, which it leaves through pipe connection 14. The cooler 11 receives cooling water through pipe 15, which flows off through pipe 16. The cooling water is added to the cooler in such a quantity, that the desired temperatures are not surpassed during the washing process.

The following will serve as a specific illustration of the carrying out of the process. It is supposed, that for instance 1000 cubic meters of gas, having a temperature of 130° C. are conducted through pipe 1 to the tar injector 2; at this temperature the gas contains about 550 grams=0.69 cubic meters of steam in 1 cubic meter. The specific heat of the gas is 0.35 calories for 1 cubic meter, and the specific heat of the steam is 0.38 calories for 1 cubic meter. After the gas has been freed from tar its temperature is 76° C., the decrease of temperature therefore amounts to 54° C., and the following amount of heat has to be absorbed:

For cooling 1000 cbm. of gas=1000 . 0.35 . 54=18900 cal.
For cooling 690 cbm. water steam=
690 . 0.38 . 54=14159 cal.
=33059 cal.

At the final temperature of the gas of 76° C. no condensation of steam should take place.

Tar has a specific heat of 0.288 cal. for 1 kilogram; its temperature increases from 73° C. to 78° C. when passing the washing apparatus; hereby for each kilogram of tar 5 . 0.288=1.44 calories would be bound. For 1000 cubic meters of gas 33059 calories have to be absorbed and there would be necessary $$\frac{33059}{1.44} = \text{about } 23000 \text{ kilograms of tar.}$$

1000 cubic meters of gas pass in a certain time through pipe 1 into the tar injector 2, whereas in the same time 23000 kilograms of tar are conducted to the washing apparatus through pipe 3 by means of the pump 4. By this process the gas is cooled 54° C., that is to say, to 76° C., whereas the tar is heated from 73° C. to 78° C.

The mixture of gas and tar falls down through pipe 5 into the vessel 6, where they are separated. The tar loses in this vessel its increase in temperature of 5° C. by surface cooling and is returned into the injector by means of the pump 4. If the temperature of the gas should change, the amount of the washing liquid is regulated by adjusting valve 10 in such a way, that the temperature of the outflowing tar does not surpass 80° C. If the gas has such a high temperature, that the temperature of the tar which is at the disposal or necessary for the washing process would surpass 80°, the gas is led through the cooler 11 before entering the tar injector. In case the washing liquid cannot be brought by the pump in sufficient quantity or that tar is not at disposal, ammonia liquor may be added through pipe 17 by opening valve 18, which cools the gas before entering the injector.

22 designates ammonia recovery apparatus into which the gas passes after leaving the tar extractor.

The operative conditions as to temperature, necessary to prevent condensation of water with loss of ammonia and other troubles, and to prevent loss of the valuable components of the tar extracted from the gas, have been carefully ascertained, and stated above by me, with reference to a gas containing the percentage of watery vapor hereinbefore specified. It will be obvious to those skilled in the art that with materially varying percentages of watery vapor and volatile hydrocarbons in the gas, and particularly with materially dryer gas and gas containing relatively small proportions of volatile hydrocarbons, the range of available temperatures in the tar extractor will increase, it being possible, with a comparatively dry gas, to reduce the temperature of the gas materially without passing the dew point, in reference to watery vapor, and it being possible when the gas contains small proportions of volatile hydrocarbons or contains little hydrocarbon volatile at or above 80° C., to permit the temperature of the washing liquid to rise above 80° C., without material loss of tar constituents.

The temperatures mentioned above are for the process when conducted at or near the sea level. It will be understood by those skilled in the art that when the process is conducted at higher altitudes the temperatures may be lower in proportion to decrease of boiling point and increase of vapor tension at such altitudes, as compared with the sea level.

Claims:

1. A process of removing tar from gases resulting from distillation of carbonaceous matter, without condensation of watery vapor, which consists in washing the gas with a washing liquid, the temperature and rate of flow of which is so regulated with reference to the volume, temperature and vapor contents of the gas, that the temperature of the gas during and after washing and prior to treatment for the recovery of ammonia, shall not be low enough to result in the condensation of water and that the temperature of the washing medium after use shall not be high enough to exceed the temperature at which more than minimal proportions of the more volatile constituents of the tar will be carried off by the washed gas.

2. A process of removing tar from gases resulting from distillation of carbonaceous matter, without condensation of watery vapor, which consists in washing the gas with a washing liquid, the temperature and rate of flow of which is so regulated with reference to the volume, temperature and vapor contents of the gas, that the temperature of the gas during and after washing and prior to treatment for the recovery of ammonia, shall not be lower than 60° centigrade for operations at sea level, and shall not be lower than corresponding temperatures of condensation for operations conducted at higher altitudes, and that the temperature of the washing medium after such use shall not be high enough to exceed the temperature at which more than minimal proportions of the more volatile constituents of the tar will be carried off by the washed gas.

3. A process of removing tar from gases resulting from distillation of carbonaceous matter, without condensation of watery vapor, which consists in washing the gas with a washing liquid, the temperature and rate of flow of which is so regulated with reference to the volume, temperature and vapor contents of the gas, that the temperature of the gas during and after washing and prior to treatment for the recovery of ammonia, shall not be low enough to result in the condensation of water and that the temperature of the washing medium after use shall not be higher than 80° centigrade for operations conducted at the sea level nor higher than corresponding temperatures of vaporization for operations conducted at higher altitudes.

4. A process for removing tar from gases resulting from the distillation of carbonaceous matter, consisting in washing the gas, to remove the tar, with a tar spray, and so regulating the temperature and volume of washing liquid that the temperature of the washed gas is between the dew point of such gas, with respect to the water vapor content thereof, and the temperature at which more than minimal proportions of light hydrocarbon constituents of the tar are carried away by the washed gas.

5. A process of recovering by-products from gases resulting from the distillation of carbonaceous matter, which consists in treating the gas with a tar-removing substance and in such treatment maintaining the temperature of the treatment below that at which tar vapor is condensed and below that at which more than minimal proportions of the more volatile constituents of the tar will be carried off by the washed gas and the temperature of the gas above that at which contained water vapor is condensed, and while the treated gas is kept at a temperature above that at which the contained water vapor will condense, removing the ammonia.

6. A process for removing tar from the hot gases resulting from the dry-distillation of coal and other carboniferous matter, consisting in washing the gas with tar or gas water containing tar, the temperature of the washing medium being below 80° C. and above 25° C.

7. A process for removing tar from the hot gases resulting from the dry-distillation of coal and other carboniferous matter, consisting in washing the gas with tar or gas water containing tar, the temperature of the washing medium being between 60° and 80° C.

8. A process for separating tar from gases resulting from the distillation of coal and the like by means of tar and tarry gas water, wherein the hot raw gases at a temperature above 80° C. are treated with said washing means which is at a temperature below 80° C. in such quantities that the cooler washing means, in washing the hotter gases, does not 5 rise above 80° C. and that the gas does not fall in temperature below 60° C.

In testimony whereof I have signed this specification in the presence of two subscribing witnesses.

GUSTAV HILGENSTOCK.

Witnesses:
BESSIE F. DUNLAP,
MORRIS VANDORY.